Aug. 30, 1966     M. H. MEHR     3,270,260
STICK-OPERATED DIAPHRAGM CONTROL
Filed Nov. 18, 1963     2 Sheets-Sheet 1
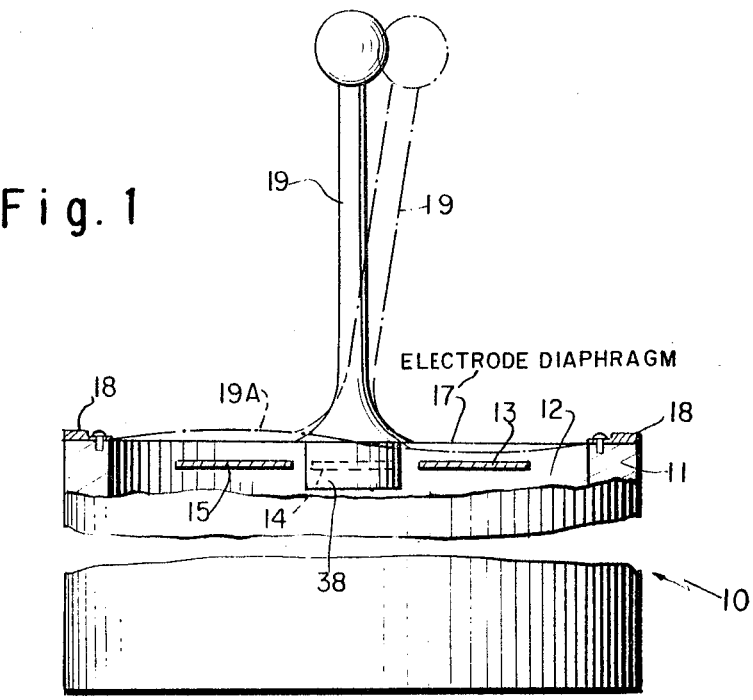
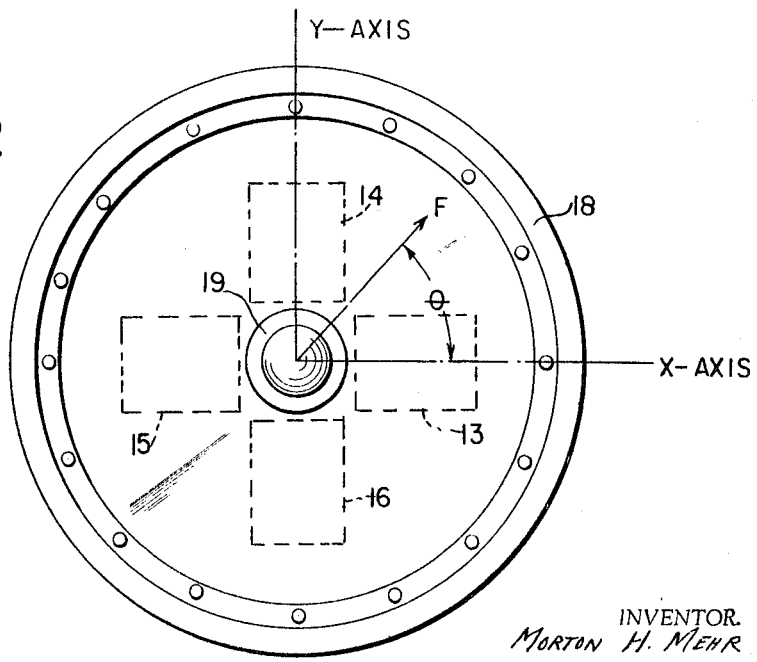
INVENTOR.
MORTON H. MEHR
BY
Robertson & Smythe
ATTORNEYS INVENTOR.
MORTON H. MEHR
BY Robertson & Smyth
ATTORNEYS

United States Patent Office 3,270,260
Patented August 30, 1966

1

3,270,260
STICK-OPERATED DIAPHRAGM CONTROL
Morton H. Mehr, Norwalk, Conn., assignor to Measurement Systems, Inc., South Norwalk, Conn., a corporation of Connecticut
Filed Nov. 18, 1963, Ser. No. 324,523
3 Claims. (Cl. 317—255)

The present invention relates to hand controls and particularly to an improved force-operated hand control.

Devices such as fire control systems, film readers, radar and optical trackers, vehicles, manipulators, machine tools, cranes and many other devices require primary transducers in combination with servo systems for effecting human control over such devices.

Human engineering studies have shown that an operator of devices of the above type has better control of the primary transducer between the operator and the machine being controlled with finger pressure rather than with positive displacement of the transducer.

"Isometric" or "stiff-stick" type of hand controls as well as pressure type controls have been constructed and used in the past on tracking mounts, principally large optical tracking devices, as well as on the above-referred-to devices. Previously designed isometric controls exhibited hysteresis, i.e., electrical drift was often encountered due to mechanical constructions which transmitted control force to the electrical pick-ups. Spring-returned controls of the "joy-stick" type, which are a combination of displacement and force-operated hand controls, additionally included backlash and "dead-zone" effects which materially reduced control accuracy.

The principal object of the present invention is to provide a control by which a human operator can accurately control one or a plurality of variables such as position, velocity, acceleration, or a combination of two or all three, or, for example, azimuth and elevation angle in a two-axis system.

Another object of the invention is to provide such a control with reduced hysteresis and drift.

Another object of the invention is to provide such a control which eliminates the effects of backlash and "dead zone."

Still another object of the invention is to provide such a control that will not be affected by sudden accelerations of the device to which it is applied.

A further object of the invention is to provide such a control in which temperature variations have a minimum effect on its accuracy.

A still further object of the invention is to provide such a control that is totally enclosed and is capable of being hermetically sealed.

Another object of the invention is to provide such a control that can be used in a remote location and can be operated while held by the operator.

Still another object of the invention is to provide such a control which possesses a relatively high resonant frequency and which will produce relatively small forces tending to induce resonance when it is subjected to external accelerations caused by motion of the device on which the control is mounted.

In one aspect of the invention, electrical pick-up means in plate form may be located within a plane and at 90-degree intervals about a point therein within a housing.

In another aspect of the invention, opposing plates may form the pick-ups of two separate capacitance bridge circuits.

In still another aspect of the invention, a relatively rigid, electrically grounded diaphragm may be mounted in said housing in a plane parallel to that including the capacitance pick-up plates and spaced a few thousandths of an inch from said pick-up plate. The spacing from the pick-up plates to the diaphragm determines the capacity from said plates to ground.

In another aspect of the invention, a stick may be fixed to the center of the diaphragm and it may extend outwardly therefrom on the side thereof opposite that adjacent the pick-up plates.

In a still further aspect of the invention, the construction is such that a force on the stick along either of the axes of the pick-up plates for the bridge circuits unbalances them and produces a signal with amplitude proportional to the force on the stick and phase of 0° or 180° depending upon the direction of the force. If the directions of the axes of the two sets of pick-up plates, which are perpendicular to each other, represent the "x" and "y" axes, then a force in the "x" direction will produce an unbalance in the "x" bridge, and a force in the "y" direction will produce an unbalance in the "x" bridge, and a force in the "y" direction will produce an unbalance in the "y" bridge.

In still another aspect of the invention, the control acts vectorially in that if the force F is applied to the stick at an angle $\theta$ to the "x" direction, the unbalance signals along the "x" and "y" axes will be $F \cos \theta$ for the former and $F \sin \theta$ for the latter.

In still another aspect of the invention, the unbalance signals are amplified and demodulated to produce two D.C. voltages, $E_x$ and $E_y$.

The above, other objects and novel features of the improved hand control will become apparent from the following specification and accompanying drawings which are merely exemplary.

In the drawings:

FIG. 1 is an elevational view, partly in section, of a hand control to which the principles of the invention have been applied;

FIG. 2 is a top plan view of the control of FIG. 1; and

Figure 3:
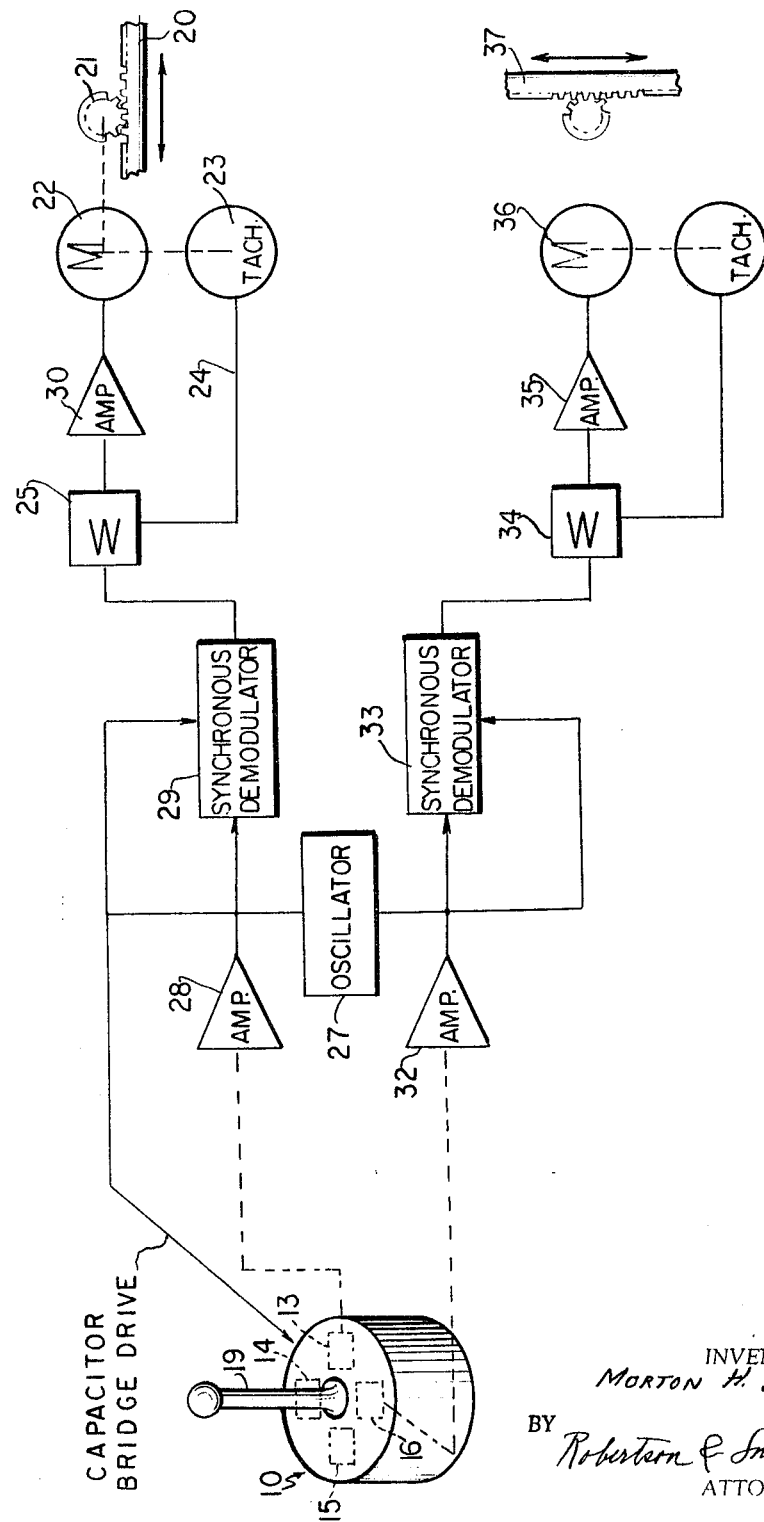
FIG. 3 is a block diagram of the control of FIG. 1 as it is used to control motion along two axes.

Referring to the drawings, the principles of the invention are shown as applied to a hand control including a housing 10 which in the embodiment disclosed is shown as a hollow cylinder 11 having one open end 12. Mounted within the housing 10 in any suitable manner and within a single plane are four pick-up plates 13, 14, 15 and 16 which may be made from electrically conductive material. Plates 13 and 15 are located in aligned relation along one axis which may be designated the "x" axis; and plates 14 and 16 are located in aligned relation along another axis at right angles to the "x" axis which may be designated the "y" axis.

The plates 13 and 15 may form branches of one impedance bridge circuit such as capacitance or inductance (magnetic) types, and plates 14 and 16 form branches of another separate capacitance on magnetic bridge circuit, both of which may be located within the housing 10 and hermetically sealed therein.

Impedance bridges are well known, and the type referred to may include constant resistances in two legs of a four-legged bridge. The other two legs may include the variable impedance means such as variable capacitors or variable inductance (magnetic) including the plates 13 and 15 or magnetic elements as known in the art. A source of alternating current is applied across the bridge, and variation of the capacitance or inductance (magnetic) in one of the legs containing said variable impedance produces a signal.

A relatively rigid, thin, metal electrode diaphragm 17 may cover the open end 12 of housing 10 and it may be rigidly secured to the top of the housing 10 by screws 18. As the handle 19 is moved, the diaphragm will take the approximate form seen in dotted lines 19A, the movement of the handle being accentuated as a result.

A stick or handle 19 may be integrally attached to the diaphragm at its center. The construction is such that a force along the "x" axis deflects the stick 19 and diaphragm 17 into the dotted line positions shown in FIG. 1, so that the diaphragm moves closer to pick-up plate 13 and farther from plate 15, providing an unbalanced condition in the bridge including plates 13 and 15. Conversely, a force applied to stick 19 along the "y" axis produces an unbalance in the bridge including plates 14 and 16.

Referring to FIG. 2, if a force F is applied to stick 19 in a direction making the angle $\theta$ with the "x" axis, the "x" axis bridge will produce an unbalance signal proportional to F cos $\theta$; and the "y" axis bridge will produce an unbalance signal proportional to F sin $\theta$.

Referring to FIG. 3, a rack 20 may be moved along the "x" axis by a pinion 21 driven by a motor 22, the rotation of which is controlled by an amplified D.C. signal. The motor 22 may also drive a tachometer 23, the output 24 of which feeds back to a summation component 25.

The unbalance signal from the bridge including plates 13 and 15 is fed to an amplifier 28. The output signal from the bridge is amplified by amplifier 28, and the amplified signal is fed to a demodulator 29 that is powered from oscillator 27. A signal from the oscillator 27 also is fed to the two capacitor bridges.

The output of demodulator 29 is fed to the summation component 25 where it mixes with the feedback signal 24. The output of component 25 represents the error signal that is proportional to the velocity of rack 20. This output error signal is a D.C. voltage that is amplified by amplifier 30, and its output controls the D.C. motor 22 to effect movement of rack 20 along the "x" axis.

The unbalance signal from the bridge including the pick-up plates 14 and 16 is fed to components 32, 33, 34 and 35 similar to components 28, 29, 25 and 30, respectively, to control a D.C. motor 36 for controlling the velocity of a rack 37 along the "y" axis.

Referring again to FIG. 1, the stick or handle 19 may include a portion 38 extending downwardly into housing 10 and constructed in a manner to balance stick 19 so that if the control is mounted in a device that is subjected to excessive acceleration, such as a space capsule, there will be no erroneous unbalance signals caused by the stick due to such excessive acceleration.

The pick-up also may be magnetic, solid state or resistive which will respond to pressure or very small displacements.

Although the various features of the improved hand control have been shown and described in detail to fully disclose one embodiment of the invention, it will be evident that changes may be made in such details and certain features may be used without others without departing from the principles of the invention.

What is claimed is:

1. In a hand control for controlling a plurality of variables, a housing having a mounting surface; a relatively rigid diaphragm on said mounting surface having a substantially planar configuration; a signal producing arrangement including spaced opposing pairs of pick-up means, pick-up means adjacent to said diaphragm; and a stick secured to and solely supported by said diaphragm at a point thereon near the intersection of the axes along which said pick-up means are located, so that movement of said stick from its rest position will apply a torque to and move a portion of said diaphragm close to one of said pick-up means and away from another of said pick-up means to produce an unbalance signal therebetween.

2. In a hand control for controlling a plurality of variables, a housing having an open end; pick-up plates arranged in a plane along right angularly disposed axes; separate capacitance bridge circuits within said housing and constituting signal producing means including the plates along said axes; a relatively rigid diaphragm closing the open end of said housing, said diaphragm lying in a plane parallel to the plane including said pick-up plates an dspaced therefrom a relatively small distance; and a stick secured to and solely supported by said diaphragm at a point thereon coincident with the intersection of the axes along which said pick-up plates are located whereby movement of said stick applies a torque to and moves a portion of said diaphragm close to one pick-up plate and away from another pick-up plate to produce an unbalance signal therebetween.

3. In a hand control for controlling a plurality of variables, a housing having an open end; signal producing means mounted within said housing including pick-up plates arranged in a plane along right angularly disposed axes; a relatively rigid diaphragm closing the open end of said housing, said diaphragm lying in a plane parallel to the plane including said pick-up plates and spaced therefrom a relatively small distance; and a stick secured to and solely supported by said diaphragm at a point thereon coincident with the intersection of the axes along which said pick-up plates are located, said stick including a portion on each side of said diaphragm to balance said stick against mechanical forces whereby movement of said stick applies a torque to and moves a portion of said diaphragm close to one pick-up plate and away from another pick-up plate to produce an unbalance therebetween.

References Cited by the Examiner

UNITED STATES PATENTS

| | | | |
|---|---|---|---|
| 2,383,973 | 9/1945 | Jones | 200—168 |
| 2,808,545 | 10/1957 | Hirtreiter | 317—246 |
| 2,903,663 | 9/1959 | Collina | 336—134 |
| 3,109,984 | 11/1963 | Mehr | 317—246 |

FOREIGN PATENTS 898,903   4/1945   France.

LARAMIE E. ASKIN, *Primary Examiner.*

JOHN F. BURNS, ROBERT K. SCHAEFER,
*Examiners.*

E. GOLDBERG, *Assistant Examiner.*